United States Patent [19]

Epstein et al.

[11] 4,325,836

[45] Apr. 20, 1982

[54] NOVEL TITANIUM HALIDE CONTAINING CATALYST

[75] Inventors: Ronald A. Epstein; Robert I. Mink, both of Yonkers, N.Y.

[73] Assignee: Stauffer Chemical Company, Westport, Conn.

[21] Appl. No.: 170,262

[22] Filed: Jul. 18, 1980

[51] Int. Cl.$^3$ .............................................. C08F 4/64
[52] U.S. Cl. ................................. 252/429 B; 526/125
[58] Field of Search .................................... 252/429 B

[56] References Cited

U.S. PATENT DOCUMENTS

| | | | |
|---|---|---|---|
| 3,549,717 | 12/1970 | Itakura et al. | 252/429 B X |
| 3,642,746 | 2/1972 | Kashiwa et al. | 252/429 B X |
| 3,670,043 | 6/1972 | Kubicek et al. | 252/429 B X |
| 3,953,414 | 4/1976 | Galli et al. | 526/348 |
| 4,013,823 | 3/1977 | Longi et al. | 526/166 |
| 4,107,414 | 8/1978 | Giannini et al. | 252/429 B X |
| 4,130,503 | 12/1978 | Fodor | 252/429 B |
| 4,143,223 | 3/1979 | Toyota et al. | 252/429 B X |
| 4,146,502 | 3/1979 | Yokoyama et al. | 252/429 B |
| 4,148,756 | 4/1979 | Langer | 252/429 B |

FOREIGN PATENT DOCUMENTS 1023 2/1978 South Africa .

OTHER PUBLICATIONS

Chem. Ab. 92:129640n, Japanese Tokkyo Kono 79 34,429, Kuroda et al.

*Primary Examiner*—Patrick Garvin
*Attorney, Agent, or Firm*—Henry Z. Friedlander

[57] ABSTRACT

A novel catalyst system for the polymerization of alpha-olefins is provided. The catalyst system comprises:

(a) an organoaluminum containing component, e.g. triethyl aluminum, and (b) a titanium halide containing component.

The titanium halide containing component is obtained by reacting a halogen containing magnesium compound, e.g. $MgCl_2$, with an organic phosphite, e.g. triphenyl phosphite, to produce a reaction product. The reaction product is then co-pulverized with a complex of a titanium halide compound and an electron donor compound, e.g. $TiCl_4$.ethyl benzoate, to produce a co-pulverized product. The co-pulverized product is then reacted with a titanium halide compound, e.g. $TiCl_4$.

A novel titanium halide containing component is provided as well as a process for producing said component. A process for the polymerization of alpha-olefins is also provided.

39 Claims, No Drawings

NOVEL TITANIUM HALIDE CONTAINING CATALYST

BACKGROUND OF THE INVENTION

1. Field of the Invention

This invention relates to a novel catalyst system for the polymerization of alpha-olefins, a novel titanium halide containing catalyst component used in said system, a process for producing said component and a process for the polymerization of alpha-olefins using such catalyst system.

2. Prior Art

The polymerization of alpha-olefins in the presence of a catalyst system comprising: (a) an organoaluminum containing component, and (b) a titanium halide containing component is well known in the art and the polymers produced utilizing such catalyst systems have found numerous uses. The resulting crystalline polymers have associated therewith, to a greater or lesser degree, a low molecular weight amorphous polymer. The production of polymers having a low concentration of such amorphous polymers results in a polymer having highly desirable properties. The production of highly stereoregular crystalline polymers is thus a desirable objective for a catalyst system and polymerization process.

It is also desirable that high amounts of polymer be produced per unit of time per unit of catalyst employed, i.e. the catalyst system have a high activity. Ideally, it is highly desirable to simultaneously improve the stereospecificity and activity of a catalyst system.

Various approaches to achieving the aforementioned objectives have been proposed in the art.

South African Pat. No. 78/1023 to Toyota et al. describes producing a titanium halide containing component by reacting a mechanically pulverized product of an organic acid ester and a halogen containing magnesium compound, with an active hydrogen containing organic compound in the absence of mechanical pulverization. The resulting reaction product is then reacted with an organometallic compound of a metal of Groups I to III of the Periodic Table in the absence of mechanical pulverization. The resulting solid reaction product is then washed with an inert organic solvent, and the resultant solid reacted with a titanium compound in the absence of mechanical pulverization. The resultant solids are then separated from the reaction system. This reference, however, does not teach reacting with an organic phosphite and requires an active hydrogen containing organic compound and an organometallic compound.

U.S. Pat. No. 4,143,223 to Toyota et al. describes reacting a mechanically co-pulverized solid component of, for example, magnesium chloride, an organic acid ester and an active hydrogen containing compound, e.g. phenol, with a tetravalent titanium compound, e.g. $TiCl_4$. This reference does not teach reacting with an organic phosphite.

Japanese Tokkyo Koho No. 79 34,429 to Kuroda et al. (as reported in CA 92:129640n) polymerizes ethylene using a mixture of trialkylaluminum, alkylhaloaluminum, and a ball milled solid product of Mg halide, phosphite esters, Ti(IV) compounds and Ti(III) compounds. This titanium halide containing component is produced by a different process using different ingredients than the invention described herein.

U.S. Pat. No. 4,130,503 to Fodor describes a catalyst component comprising a magnesium chloride support, a titanium trichloride, an aluminum trichloride and an organic phosphite. Exemplary of such a component is an $MgCl_2$ supported $TiCl_3.1/3AlCl_3$ plus triphenyl phosphite catalyst component. This reference, however, does not describe the use of an electron donor compound or $TiCl_4$ and generally relates to a different class of catalyst components with respect to the activity thereof.

U.S. Pat. No. 3,953,414 to Galli et al. describes the use of triphenyl phosphine and triisobutyl aluminum in conjunction with a titanium halide containing catalyst component prepared in a specific manner from $MgCl_2$ and $TiCl_4$. This reference does not describe producing the titanium halide containing catalyst component of this invention.

Additionally, in the Assignee's U.S. Ser. No. 163,615, filed June 23, 1980, the titanium halide containing component is obtained by co-pulverizing a halogen containing magnesium compound with an electron donor compound. This is then reacted with an organic phosphite to produce a reaction product which is then reacted with a titanium halide compound. This does not teach or suggest reacting the magnesium compound with an organic phosphite followed by a complex of a titanium halide material and an electron donor.

Other references of interest are U.S. Pat. Nos. 4,148,756 to Langer; 4,013,823 to Longi et al., 4,146,502 to Yokayama et al.; 4,107,414 to Giannini et al. and 3,642,746 to Kashiwa et al.

SUMMARY OF THE INVENTION

In accordance with this invention, there is provided a novel catalyst system for the polymerization of alpha-olefins. The catalyst system comprises:
(a) an organoaluminum containing component; and
(b) a titanium halide containing component obtained by:
  (i) reacting a halogen containing magnesium compound with an organic phosphite to produce a reaction product;
  (ii) co-pulverizing the reaction product with a complex of a titanium halide compound and an electron donor compound to produce a co-pulverized product;
  (iii) reacting the co-pulverized product with a titanium halide compound.

In accordance with another aspect of this invention, a process is provided for the polymerization of alpha-olefins using the aforesaid catalyst system.

In accordance with still another aspect of this invention, a novel titanium halide containing component and a process for producing said component are provided.

DETAILED DESCRIPTION OF THE INVENTION

The invention as described herein is broadly applicable to the polymerization of olefins, corresponding to the formula R—CH=$CH_2$, wherein R is an alkyl radical containing from 1 to 8 inclusive carbon atoms, and hydrogen. The preferred olefins, however, include propylene, 1-butene, 1-pentene, 4-methyl-1-pentene and the like. The term "polymer" as used herein includes both homopolymers and copolymers, and the polymerization of mixtures of alpha-olefins with minor proportions of ethylene, as well as the polymerization of ethylene.

For the purposes of simplification the invention is described herein with particular reference to the polymerization of propylene, however, the invention is not to be so limited.

In the formation of the titanium halide containing component (b), the first step (i) is to react a halogen containing magnesium compound with an organic phosphite to produce a reaction product. Preferably, this is done in the absence of mechanical pulverization.

In the present application, the term "co-pulverizing", "pulverization", etc. denote pulverization by suitable means by bringing the reaction components into mutual contact, for example, milling in a ball mill, vibratory mill or impact mill, and does not include more mechanical stirring within its scope. Accordingly, the term "absence of mechanical pulverization" means the absence of such pulverizing means but does not preclude the presence of mere mechanical stirring that is customarily used in chemical reactions.

Preferably the reacting step (i) is carried out in the presence of an inert organic liquid diluent such as hexane, heptane, kerosene or toluene. The reaction can be performed, for example, by adding the organic phosphite to a suspension of the magnesium compound in an inert organic liquid diluent. The amount of the magnesium compound is preferably about 10 to about 1,000 grams per liter of diluent. The reaction is carried out preferably at a temperature of about 0° C. to about 150° C. and a reaction time is, for example, from about 10 minutes to about 10 hours. The amount of the organic phosphite can be properly chosen and is preferably about 0.01 to about 10 moles, more preferably about 0.1 to about 10 moles, per mole of the magnesium compound.

After the reaction, the unreacted organic phosphite is removed by filtration or decantation, and the reaction product may be washed with a suitable inert solvent such as hexane, heptane, or kerosene to remove the soluble organic phosphite as much as possible. The reaction product may then be dried.

The halogen containing magnesium compound is desirably a solid which is preferably as anhydrous as possible, but the inclusion of moisture in an amount which does not substantially affect the performance of the catalyst is permissible. For the convenience of handling, it is advantageous to use the magnesium compound as a powder having an average particle diameter of about 0.1 to about 50 microns. Larger particles can be used, because they can be pulverized during the co-pulverizing step (ii). The halogen containing magnesium compound may be those which contain other groups such as an alkoxy or phenoxy group, but magnesium dihalides give the best results.

Examples of preferred halogen containing magnesium compounds are magnesium dihalides such as magnesium chloride, magnesium bromide and magnesium iodide. Magnesium chloride is the most preferred, however, a magnesium phenoxy halide such as:

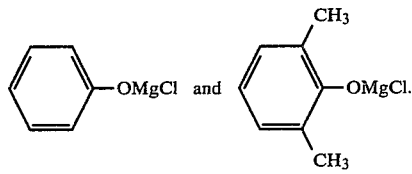

may also be used.

The organic phosphites used in this invention include polyphosphites, for example, distearyl pentaerythritol diphosphite. Preferably, however, the organic phosphites are of the formula:

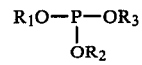

wherein $R_1$, $R_2$ and $R_3$ are each independently selected from the group consisting of alkyl from 1 to 20 carbon atoms, aryl and alkyl substituted aryl wherein the aryl substituent is from 6 to 18 carbon atoms and the alkyl substituent is from 1 to 20 carbon atoms, and cycloalkyl from 5 to 24 carbon atoms.

Preferably, $R_1$, $R_2$ and $R_3$ are the same.

Preferably, the organic phosphite in the titanium containing catalyst component is an aryl phosphite or alkyl substituted aryl, and more preferably a triaryl phosphite. Most preferred is triphenyl phosphite (TPP). Other suitable phosphites are tri-1-naphthyl phosphite, tri-9-anthryl phosphite, tri-4-phenanthryl phosphite, tri-o-tolyl phosphite, tri-p-cumenyl phosphite, trinonaphenyl phosphite, tri(cyclohexylphenyl) phosphite, tri(6-cycloheptyl-2-naphthyl) phosphite, tri(10-cyclodecyl-9-anthryl) phosphite, tri(3-cyclopentylphenyl) phosphite, tri(4-12-naphthyl)phenyl phosphite, tri(7-phenyl-1-naphthyl) phosphite, tri(6-phenyl-2-anthryl) phosphite, tri(7-phenyl-1-phenanthryl) phosphite, and the like.

Other organic phosphites that may be used are the tri-methyl, ethyl, propyl, etc. phosphites, tri-cyclohexyl phosphite, and the aforementioned polyphosphites.

The reaction product is then co-pulverized with a complex of a titanium halide compound and an electron donor compound to produce a co-pulverized product, i.e. co-pulverizing step (ii).

In preparing the co-pulverized product, the reaction product from step (i) and the complex may be separately fed in the free state and mechanically pulverized or they may be contacted in advance to form a complex or adduct, and mechanically pulverized in this state. Alternatively, the product can be produced by co-pulverizing compounds which can form the complex under mechanical pulverization.

The mechanical pulverization is performed preferably in the substantial absence of oxygen and water using, for example, a ball mill, vibratory mill, or impact mill. The pulverization time, although different from apparatus to apparatus, for example, is about 1 hour to about 10 days. The pulverization can be performed at room temperature, and it is not particularly necessary to heat or cool the pulverization system. Where there is a vigorous exotherm the pulverization system is preferably cooled by a suitable means. The temperatures, for example, may be about 0° to about 100° C. Preferably, the pulverization is carried out until the pulverized product attains a surface area of at least 3 m²/g, especially at least 30 m²/g. The pulverization is usually carried out in a single step, but if desired may be carried out in a multiplicity of steps. For example, it is possible first to pulverize the reaction product from step (i) with, perhaps, pulverization aids (described hereinbelow) and then add the complex and continue the pulverization.

The co-pulverizing step (ii) may be performed, but not necesarily, in the presence of an organic or inorganic pulverization aid. Examples of pulverization aids include inert liquid diluents such as hexane, heptane and kerosene; organic solid diluents such as polystyrene and polypropylene and inert inorganic solids such as boron oxide, silicon oxides and organosiloxanes. The pulverization aids can be used in an amount of about 0.01 to about 1 times the weight of the reaction product from step (i).

The amount of complex used in forming the co-pulverized product of step (ii) is about 0.01 to about 1 mole, preferably about 0.01 to about 0.1 moles per mole of halogen containing magnesium compound.

The titanium halide containing components in the complex contain a halogen compound of either trivalent or tetravalent titanium. Preferred titanium halides are a titanium trichloride material (described below) and titanium tetrachloride.

The titanium trichloride material can be produced in a variety of ways including:
(a) reaction of titanium tetrachloride with a metal such as aluminum or titanium, the reduced titanium material being either milled or unmilled;
(b) reduction of titanium tetrachloride with hydrogen;
(c) reduction of titanium tetrachloride with an organometallic compound such as an aluminum alkyl; or
(d) grinding a combination of titanium trichloride and a halide of a Group III metal, such as an aluminum halide.

Examples of suitable titanium trichloride materials are well known in the art and are described in a number of publications and patents, including U.S. Pat. Nos. 3,639,375 to Staiger et al. and 3,701,763 to Wada et al. which are each incorporated herein by reference as showing the type of titanium trichloride material that may be used in the present invention.

Examples of specific titanium halide compounds which may be contained in the component are $TiCl_4$, $TiI_4$, $Ti(OC_3H_7)Cl_3$, $Ti(OC_4H_9)_2CL_2$, $3TiCl_3 \cdot AlCl_3$, $Ti[O-C(CH_3)-CH-CO-CH_3]_2Cl_2$, $Ti[N(C_2H_5)_2]Cl_3$, $Ti(OC_6H_5)Cl_3$, $Ti[N(C_6H_5)_2]Cl_3$, $Ti(C_6H_5COO)Cl_3$, $[N(C_4H_9)_4]_2TiCl_6$ $[N(CH_3)_4]Ti_2Cl_9$, $TiBr_4$, $TiCl_3OSO_2C_6H_5$, and $LiTi(OC_3H_7)_2Cl_3$.

The titanium halide compound, e.g. the titanium trichloride material or titanium tetrachloride, is combined with an amount of electron donor compound. Examples of suitable electron donor compounds which can be used can be selected from those described in U.S. Pat. Nos. 3,639,375 to Staiger et al. and 3,701,763 to Wada et al. and those described below for use in the organoaluminum containing component. The following classes of electron donor compounds may be used:

Organic oxygen-containing compounds such as the aliphatic ethers, aromatic ethers, aliphatic carboxylic acid esters, cyclic esters of carbonic acid, aromatic carboxylic acid esters, unsaturated carboxylic acid esters, aliphatic alcohols, phenols, aldehydes, aliphatic carboxylic acids, aromatic carboxylic acids, aliphatic carboxylic acid halides, lactones, aromatic carboxylic acid halides, aliphatic ketones, aromatic ketones, and monoterpenic ketones;

Organic nitrogen-containing compounds such as the aliphatic amines, aromatic amines, heterocyclic amines, aliphatic nitriles, aliphatic carbamates, aromatic nitriles, aromatic isocyanates and aromatic azo compounds;

Mixed oxygen-nitrogen compounds such as the aliphatic and aromatic amides and quanidine and its alkyl substituted derivatives;

Organic phosphorous-containing compounds such as the aliphatic phosphines, aromatic phosphines;

Mixed phosphorus-nitrogen compounds such as the phosphoric amides;

Sulfur-containing compounds such as carbon disulfide, the aliphatic thioethers and the aromatic thioethers; and Organic silicon-containing compounds including monomer type compounds such as organoaminosilanes, organoalkoxysilanes, organoaryloxysilanes, organosilicon isocyanates and organosilanol carboxylic acid esters; and polymer type of compounds such as the organopolysilanes, organopolysiloxanes, $\gamma,\omega$-dihaloorganopolysiloxanes, organocyclopolysiloxanes and polysilazanes.

Examples of some electron donor compounds are hexamethyl phosphoric triamide, dimethyl formamide, benzonitrile, $\gamma$-butyrolactone, dimethyl acetamide, N-methyl pyrrolidone, N,N-dimethylpivalamide, toluene diisocyanate, dimethyl thioformamide, ethylene carbonate, tetramethyl guanidine and methyl carbamate. Other electron-donors are: N,N,N',N'tetramethylenediamine, veratrol, ethyl benzoate, acetone, 2,5-hexanedione, dimethylmaleate, dimethylmalonate, tetrahydrofurfurylmethylether, nitrobenzene, diethyl carbonate, acetophenone, 1,2,4-trimethyl piperazine, ethyl acetate. Particularly preferred is ethyl benzoate. Others that can be used in practicing the present invention are known to persons of skill in the art.

Organic acid esters are particularly preferred electron donors.

The organic acid ester used in forming the complex is preferably selected from the group consisting of aliphatic carboxylic acid esters, halogenated aliphatic carboxylic acid esters, alicyclic carboxylic acid esters, and aromatic carboxylic acid esters. Preferred species are aliphatic carboxylic acid esters containing up to 18 carbon atoms, halogenated aliphatic carboxylic acid esters containing up to 18 carbon atoms, alicyclic carboxylic acid esters containing up to 12 carbon atoms, and aromatic carboxylic acid esters containing up to 26 carbon atoms.

Examples of such organic acid esters are esters formed between carboxylic acids or halocarboxylic acids selected from the group consisting of saturated or unsaturated aliphatic carboxylic acids containing 1 to 8 carbon atoms, especially 1 to 4 carbon atoms and their halogen-substitution products, and alcohols or phenols selected from the group consisting of saturated or unsaturated aliphatic alcohols containing 1 to 8 carbon atoms, especially 1 to 4 carbon atoms, saturated or unsaturated alicyclic alcohols containing 3 to 8 carbon atoms, especially 5 to 6 carbon atoms, phenols containing 6 to 10 carbon atoms, especially 6 to 8 carbon atoms, and alicyclic or aromatic alcohols having a $C_1$–$C_4$ aliphatic saturated or unsaturated alcohol moiety bonded to an alicyclic or aromatic ring with 3 to 10 carbon atoms. Further examples include esters formed between alicyclic carboxylic acids containing 6 to 12 carbon atoms, especially 6 to 8 carbon atoms, and saturated or unsaturated aliphatic alcohols containing 1 to 8, especially 1 to 4, carbon atoms. There can also be cited esters formed between aromatic carboxylic acids containing 7 to 12 carbon atoms, especially 7 to 10 carbon atoms, and alcohols or phenols selected from the group consisting of saturated or unsaturated aliphatic alcohols containing 1 to 8 carbon atoms, especially 1 to 4 carbon atoms, and alicyclic or aromatic alcohols formed by a $C_1$–$C_4$ aliphatic saturated or unsaturated alcohol moiety bonded to an alicyclic or aromatic ring with 3 to 10 carbon atoms, and phenol.

Specific examples of the aliphatic carboxylic esters are primary alkyl esters of saturated fatty acids such as methyl formate, ethyl acetate, n-amyl acetate, 2-ethylhexyl acetate, n-butyl formate, ethyl butyrate and ethyl valerate; alkenyl esters of saturated fatty acids such as vinyl acetate and allyl acetate; primary alkyl esters of unsaturated fatty acids such as methyl acrylate, methyl methacrylate, and n-butyl crotonate, and halogen-substitution products of these esters.

Specific examples of the alicyclic carboxylic acid esters include methyl cyclohexanecarboxylate, ethyl cyclohexanecarboxylate, methyl methylcyclohexanecarboxylate and ethyl methylcyclohexanecarboxylate.

Specific examples of the aromatic carboxylic acid esters include primary alkyl esters of benzoic acid such as methyl benzoate, ethyl benzoate, n-propyl benzoate, n- or i-butyl benzoate, n- and i-amyl benzoate, n-hexyl benzoate, n-octyl benzoate, and 2-ethylhexyl benzoate; primary alkyl esters of toluic acid such as methyl toluate, ethyl toluate, n- or i-butyl toluate, and 2-ethylhexyl toluate; primary alkyl esters of anisic acid such as methyl anisate, ethyl anisate, or n-propyl anisate; and primary alkyl esters of naphthoic acid such as methyl naphthoate, n-propyl naphthoate, n-butyl naphthoate, and 2-ethylhexyl naphthoate.

Of these compounds, the aromatic carboxylic acid esters are preferred. Alkyl esters with 1 to 4 carbon atoms, particularly methyl or ethyl esters, of benzoic acid, p-toluic acid or p-anisic acid are especially preferred.

In the final step (iii) of forming the titanium halide containing component in accordance with this invention, the resultant co-pulverized product from step (ii) is reacted with a titanium halide compound. The reaction is preferably carried out in the absence of mechanical pulverization. This reaction can be performed by suspending the reacted pulverized product in a liquid titanium halide compound or a solution of a titanium halide compound in an inert organic solvent, e.g. hexane, heptane, kerosene and toluene.

The amount of the titanium halide compound used may be at least about 0.1 mole, preferably at least about 1 mole per mole of magnesium in the pulverized product from step (iii). The reaction temperature is usually from room temperature to about 200° C. and the reaction time is about 10 minutes to about 5 hours. The reaction may be performed for longer or shorter periods of time. After the reaction, the unreacted titanium halide compound is removed by filtration or decantation, and the reaction product may be washed with a suitable inert solvent, such as hexane, heptane, or kerosene to remove the soluble titanium compound as much as possible.

The titanium halide compound used in reaction step (iii) may be the same type as used in the aforementioned complex used in step (ii). Titanium tetrachloride is particularly preferred.

The organoaluminum containing component of the catalyst system of this invention contains the conventional organoaluminum compound used in the polymerization of alpha-olefins using conventional reaction conditions for such a polymerization. The organoaluminum compounds which are particularly suitable are: alkylhaloaluminum compounds having the formula $AlR_nX_{3-n}$, wherein R represents $C_{1-14}$ a saturated hydrocarbon residue; X represents a halogen, particularly Cl and Br, and n is 2, 1.5 or 1; and alkyl aluminum compounds having the formula $AlR_n(OR')_{3-n}$ where R and n are defined above and R' represents a $C_{1-14}$ saturated hydrocarbon residue that can be the same as R. Trialkyl aluminums having the formula $AlRR'R''$, where R, R' and R'' are the same or different, and respectively represent a $C_{1-14}$ saturated hydrocarbon residue are particularly preferred.

The following are examples of suitable organoaluminum compounds: trimethyl aluminum, triethyl aluminum, n-tripropyl aluminum, n-tributyl aluminum, triisobutyl aluminum, trioctyl aluminum, tridodecyl aluminum, methyl aluminum sesquichloride, ethyl aluminum sesquichloride, diethyl aluminum chloride, ethyl aluminum dichloride, dibutyl aluminum chloride, ethyl aluminum sesquibromide, and mixtures thereof. Triethyl aluminum is a particularly preferred organoaluminum compound for use in this invention for the polymerization of propylene.

The organoaluminum compounds may also, for example, contain two or more aluminum atoms linked together through an oxygen or a nitrogen atom. These organoaluminum compounds are obtained by the reaction of a trialkyl aluminum compound with water, ammonia or a primary amine, according to known methods. Typical examples of such compounds are:

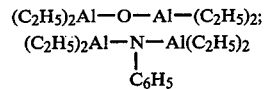

The organoaluminum containing compound is preferably used in combination with an electron donor (such as a Lewis base) to form the organoaluminum containing component.

Suitable electron donor compounds are amines, amides, ethers, esters, ketones, nitriles, phosphines, phosphoramides, aldehydes, alcoholates, amides and the organic acid salts of metals belonging to the first four groups of the Mendelyeev Periodic System. The best residue, as regards both activity and stereospecificity, are achieved when esters of carboxylic acids particularly esters of aromatic acids, are used as the electron donors.

Examples of esters which can be used are: esters of aliphatic, cycloaliphatic and aromatic mono- and polycarboxylic acids; esters of alkoxy or amino acids; esters of inorganic acids like carbonic, phosphorous, sulfuric, phosphoric and silicic acids. Examples of specific compounds are: ethylbenzoate, methylbenzoate, methyl and ethyl-p-methoxybenzoate, ethyl-n-butylbenzoate, ethyl-p- and o-chlorobenzoate, ethyl-p-butoxybenzotate, isobutylbenzoate, methyl and ethyl-p-methylbenzoate, ethylacetate, ethyl propionate, ethyl-alpha-naphthoate, ethylcyclohexanoate, ethyl pivalate, ethyl N,N-diethylcarbamate, diethyl carbonate, diethylsulfate, dimethylmaleate, ethylbenzenesulfonate, triethylborate, ethylnaphthenate.

The organoaluminum compound/electron donor molar ratio can generally be lower than 10:1 and, in the case of ester electron donors, ranges from 10:1 to 2:1, and more particularly from 6:1 to 2:1.

For general guidance, the quantity of titanium present in the titantium halide containing component is between about 0.1 and 10% by weight, expressed as titanium metal. The Al/Ti molar ratio is generally less than 1,000 and preferably less than 600, and most preferably from about 100 to about 600.

The conditions under which the polymerization of alpha-olefins with the aid of the catalyst system of this invention is conducted are those known in the art. The polymerization is carried out at temperatures ranging from −80° C. to 150° C., preferably from 40° C. to 100° C., operating with partial pressures of the alpha-olefins higher than atmospheric pressure. The polymerization can be carried out both in liquid phase in the presence or in the absence of an inert diluent, or in the gas phase. The alpha-olefins comprise in general olefins $CH_2=CHR$ in which R is an alkyl radical containing 1 to 8 inclusive carbon atoms and hydrogen. Propylene, 1-butene, 1-pentene, 4-methyl-1-pentene are preferred examples of alphaolefins. As hereinbefore indicated the process can be used to polymerize mixtures of alpha-olefins with minor proportions of ethylene and also ethylene.

Examples of inert diluents which may be used in the polymerization are the $C_4$-$C_8$ aliphatic hydrocarbons, examples of which are n-hexane, n-heptane, and cycloaliphatic hydrocarbons like cyclohexane and the aromatic ones such as benzene, toluene, and xylene.

The regulation of the molecular weight of the polymer during the polymerization may also be carried out according to known methods, e.g. operating in the presence of alkyl halides, Zn or Cd organo-metallic compounds or hydrogen.

It has been found that the catalyst system of this invention has enhanced stereospecificity and/or activity.

The following examples are given to better illustrate the present invention and are not intended to be limiting.

POLYMERIZATION PROCEDURES

Slurry Polymerization

The following polymerization procedure was utilized.

A one gallon jacketed autoclave, i.e. the polymerization reactor, equipped with a mechanical stirrer was charged with 2 liters of dry heptane at about 45° C. to 55° C.

The catalyst system was then added to the autoclave as follows:

1. A nitrogen purge was passed through the autoclave and adjusted to purge the port during the addition of the catalyst system. A weighed quantity of the organoaluminum compound was added by syringe and stirred for 5 or 10 seconds. A weighed quantity of the required electron donor was then added through the port and the reactor stirred for another 5 to 10 seconds. The solid titanium halide containing catalyst component was then added. Propylene was then injected into the autoclave to a pressure of 10 atmospheres and the temperature maintained at 65° C. During the polymerization, additional propylene was fed as needed to maintain this pressure. The polymerization test was carried out for 1½ hours.

At the end of the polymerization, the polymer mixture was filtered, washed with isopropanol, and oven dried at 70° C. and weighed to produce Dry Polymer. The polymerization solvent is evaporated to determine heptane soluble polymer.

Bulk Polymerization

The following polymerization procedure was utilized.

A 2.8 l. jacketed autoclave, i.e. the polymerization reactor, equipped with a mechanical stirrer was charged with the catalyst system as follows:

1. A nitrogen purge was passed through the autoclave and adjusted to purge the port during the addition of the catalyst system. A weighed quantity of the organoaluminum compound was added by syringe. A weighed quantity of the required electron donor was then added through the port. The solid titanium halide containing catalyst component was then added. 2 l. of liquid propylene was then added to the autoclave and the temperature of the propylene brought to 70° C. The polymerization test was carried out for 1½ hours, except where noted.

At the end of the polymerization, the polymer mixture was filtered, oven dried at 70° C. and weighed to produce Dry Polymer.

Catalyst activity is defined herein as the ratio:

$$\frac{\text{Weight of Dry Polymer and Weight Of Heptane Soluble Polymer}}{\text{Weight of Solid Catalyst Component}}$$

In all examples, the activity is grams polypropylene per gram catalyst.

The Dry Polymer is extracted with heptane for 3 hours in a Soxhlet apparatus. The percentage heptane insolubles ("$C_7$") is defined as the percentage of the heptane insoluble fraction in the Dry Polymer.

The Isotactic Index (II), a measure of the insoluble polymer produced, is defined herein as:

$$II = \frac{\text{``}C_7\text{''} \times \text{Wt. of Dry Polymer}}{\text{Wt. of Total Polymer Produced}}$$

The total polymer produced includes the Dry Polymer and the polymer produced which was soluble in the polymerization solvent.

EXAMPLE 1

16 grams of $MgCl_2$ (0.17 moles) was reacted with 40 grams of triphenyl phosphite (0.13 moles) in 100 milliliters of heptane at 95°–100° C. for 2¼ hrs. The product was filtered, washed twice with 75 milliliters of heptane and vacuum dried. 15.4 grams of this product was then milled with 4.2 grams (12.4 mmol) $TiCl_4$.ethyl benzoate for 72 hours. 10 grams of the milled product was slurried in 30 milliliters of heptane and reacted with 60 ml. (104 g., 0.55 moles) $TiCl_4$ for 1 hour at 100° C. This final product was filtered, washed four times with 75 milliliters of heptane and vacuum dried. The activity of the catalyst system for slurry polymerization using triethyl aluminum and ethyl anisate at 4:1 molar ratio (12:3 mmol/mmol) as the organoaluminum containing component was 6,082 grams of polypropylene per gram catalyst, and the II was 87.3%; with triethyl aluminum and methyl-p-toluate at the same molar ratio as the organoaluminum containing component. The activity/II was 6020/90.5%.

We claim:

1. A catalyst system comprising:
(a) an organoaluminum containing component; and
(b) a titanium halide containing component obtained by:

(i) reacting a halogen containing magnesium compound with an organic phosphite to produce a reaction product;

(ii) co-pulverizing the reaction product with a complex of a titanium halide compound and an electron donor compound to produce a co-pulverized product; and (iii) reacting the co-pulverized product with a titanium halide compound.

2. The system of claim 1 wherein the halogen containing magnesium compound is $MgCl_2$.

3. The system of claim 1 wherein the organic phosphite used is from about 0.01 to about 10 moles of phosphite per mole of magnesium compound.

4. The system of claim 1 wherein the organic phosphite has the formula:

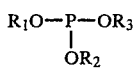

wherein $R_1$, $R_2$ and $R_3$ are each independently selected from the group consisting of alkyl from 1 to 20 carbon atoms, aryl and alkyl substituted aryl wherein the aryl substituent is from 6 to 18 carbon atoms and the alkyl substituent is from 1 to 20 carbon atoms.

5. The system of claim 4 wherein $R_1$, $R_2$ and $R_3$ are the same.

6. The system of claim 1 wherein the organic phosphite is a triaryl phosphite.

7. The system of claim 1 wherein the organic phosphite is triphenyl phosphite.

8. The system of claim 1 wherein the complex is a $TiCl_4$.ethyl benzoate complex.

9. The system of claim 1 wherein the titanium halide compound used in reacting step (iii) is a titanium trichloride material.

10. The system of claim 1 wherein the titanium halide compound used in reacting step (iii) is titanium tetrachloride.

11. The system of claim 1 wherein the quantity of titanium present in the titanium halide containing component is about 0.1% to about 10% by weight, expressed as titanium metal.

12. The system of claim 1 wherein the organoaluminum containing component comprises an organoaluminum compound and an electron donor selected from the group consisting of esters of carboxylic acids.

13. The system of claim 1 wherein the organoaluminum component comprises an organoaluminum compound and an ester of an aromatic carboxylic acid.

14. The system of claim 1 wherein the organoaluminum containing component comprises triethyl aluminum and ethyl anisate or ethyl benzoate.

15. A titanium halide containing component obtained by:

(i) reacting a halogen containing magnesium compound with an organic phosphite to produce a reaction product;

(ii) co-pulverizing the reaction product with a complex of a titanium halide compound and an electron donor compound to produce a co-pulverized product; and (iii) reacting the co-pulverized product with a titanium halide compound.

16. The component of claim 15 wherein the halogen containing magnesium compound is $MgCl_2$.

17. The compound of claim 15 wherein the organic phosphite used is from about 0.01 to about 10 moles of phosphite per mole of magnesium compound.

18. The component of claim 15 wherein the organic phosphite has the formula:

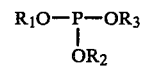

wherein $R_1$, $R_2$ and $R_3$ are each independently selected from the group consisting of alkyl from 1 to 20 carbon atoms, aryl and alkyl substituted aryl wherein the aryl substituent is from 6 to 18 carbon atoms and the alkyl substituent is from 1 to 20 carbon atoms.

19. The component of claim 18 wherein $R_1$, $R_2$ and $R_3$ are the same.

20. The component of claim 15 wherein the organic phosphite is a triaryl phosphite.

21. The component of claim 15 wherein the organic phosphite is triphenyl phosphite.

22. The component of claim 15 wherein the complex is a $TiCl_4$.ethyl benzoate complex.

23. The component of claim 15 wherein the titanium halide compound used in reacting step (iii) is a titanium trichloride material.

24. The component of claim 15 wherein the titanium halide compound used in reacting step (iii) is titanium tetrachloride.

25. The component of claim 15 wherein the quantity of titanium present in the titanium halide containing component is about 0.1% to about 10% by weight, expressed as titanium metal.

26. A process for producing a titanium halide containing component comprising:

(i) reacting a halogen containing magnesium compound with an organic phosphite to produce a reaction product;

(ii) co-pulverizing the reaction product with a complex of a titanium halide compound and an electron donor compound to produce a co-pulverized product; and (iii) reacting the co-pulverized product with a titanium halide compound.

27. The process of claim 26 wherein the halogen containing magnesium compound is $MgCl_2$.

28. The process of claim 26 wherein the organic phosphite used is from about 0.01 to about 10 moles of phosphite per mole of magnesium compound.

29. The process of claim 26 wherein the organic phosphite has the formula:

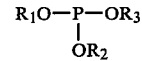

wherein $R_1$, $R_2$ and $R_3$ are each independently selected from the group consisting of alkyl from 1 to 20 carbon atoms, aryl and alkyl substituted aryl wherein the aryl substituent is from 6 to b 18 carbon atoms and the alkyl substituent is from 1 to 20 carbon atoms.

30. The process of claim 29 wherein $R_1$, $R_2$ and $R_3$ are the same.

31. The process of claim 26 wherein the organic phosphite is a triaryl phosphite.

32. The process of claim 26 wherein the organic phosphite is triphenyl phosphite.

33. The process of claim 26 wherein the complex is a TiCl₄.ethyl benzoate complex.

34. The process of claim 26 wherein the titanium halide compound used in reacting step (iii) is a titanium trichloride material.

35. The process of claim 26 wherein the titanium halide compound used in reacting step (iii) is titanium tetrachloride.

36. The process of claim 26 wherein the quantity of titanium present in the titanium halide containing component is about 0.1% to about 10% by weight, expressed as titanium metal.

37. The system of claim 1 wherein the halogen-containing magnesium compound is a solid selected from the group consisting of magnesium chloride, magnesium bromide, magnesium iodide, ethoxy magnesium chloride, butoxy magnesium chloride, and magnesium phenoxy halide.

38. The component of claim 15 wherein the halogen-containing magnesium compound is a solid selected from the group consisting of magnesium chloride, magnesium bromide, magnesium iodide, ethoxy magnesium chloride, butoxy magnesium chloride, and magnesium phenoxy halide.

39. The process of claim 26 wherein the halogen-containing magnesium compound is a solid selected from the group consisting of magnesium chloride, magnesium bromide, magnesium iodide, ethoxy magnesium chloride, butoxy magnesium chloride, and magnesium phenoxy halide.

* * * * *

UNITED STATES PATENT AND TRADEMARK OFFICE
CERTIFICATE OF CORRECTION

PATENT NO. : 4,325,836
DATED : April 20, 1982
INVENTOR(S) : Ronald A. Epstein et al.

It is certified that error appears in the above—identified patent and that said Letters Patent is hereby corrected as shown below:

Col. 2, line 19, delete "June 23, 1980" and insert -- June 27, 1980--;

Col. 3, line 14, delete "more" and insert -- mere";

Col. 5, line 18, delete "reaction" and insert -- reduction --;

Col. 5, line 37, third formula, delete "$_2CL_2$" and insert -- $_2Cl_2$ --;

Col. 5, line 67, delete "phosphorous" and insert -- phosphorus --.

Signed and Sealed this

Third Day of August 1982

[SEAL]

Attest:

Attesting Officer

GERALD J. MOSSINGHOFF

Commissioner of Patents and Trademarks